March 31, 1964   H. T. WESTERHEIM   3,127,535
VISUAL READOUT DEVICE
Filed Nov. 21, 1958   2 Sheets—Sheet 1
| INNING | 1 | 2 | 3 | 4 | 5 | 6 | 7 | 8 | 9 | | FINAL SCORE |
|---|---|---|---|---|---|---|---|---|---|---|---|
| TEAM A | 0 | 1 | 0 | 0 | | | | | | | |
| TEAM B | 0 | 0 | 0 | 1 | | | | | | | |
FIG. 1
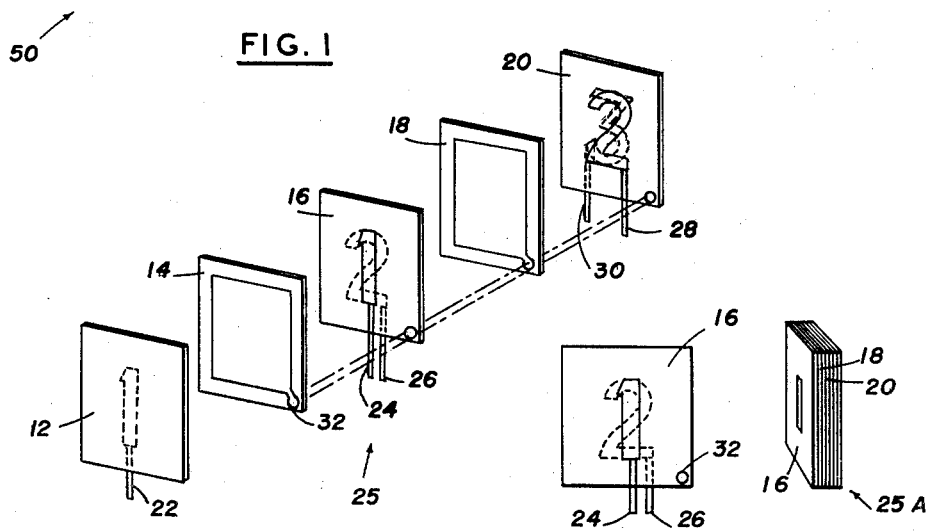
FIG. 2   FIG. 3   FIG. 4
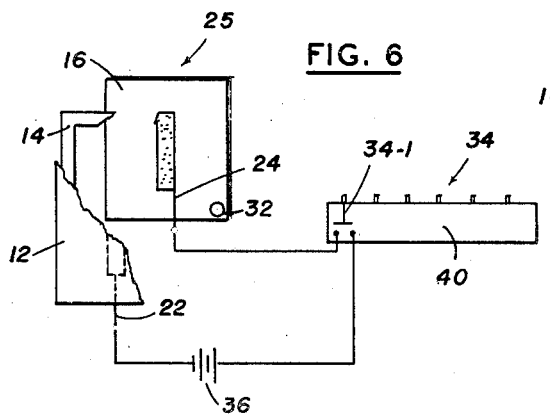
FIG. 6
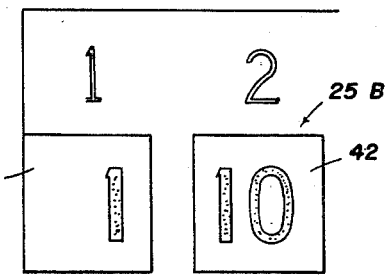
FIG. 5
INVENTOR.
H. T. WESTERHEIM
BY
*T. D. Copeland Jr.*
AGENT

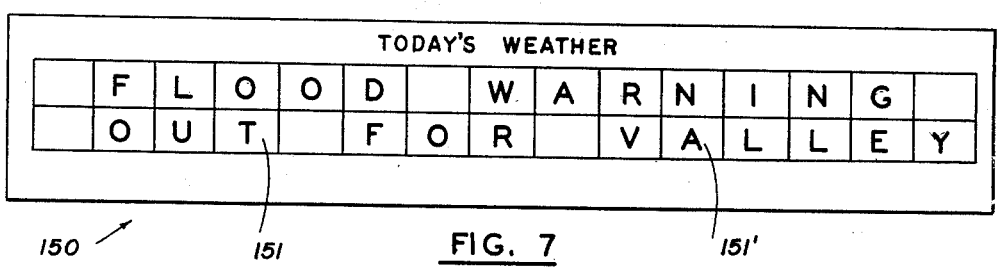
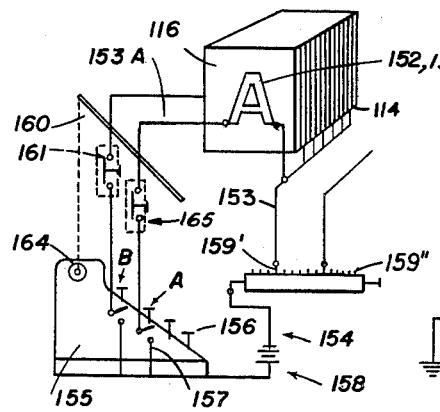
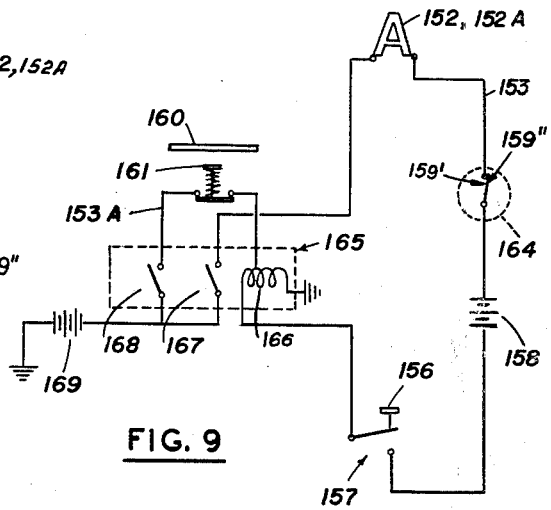
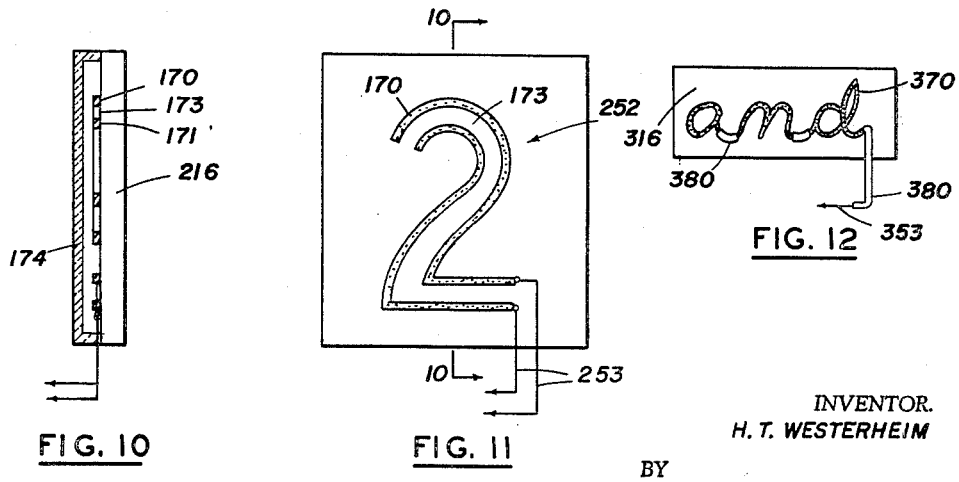

United States Patent Office 3,127,535
Patented Mar. 31, 1964

3,127,535
VISUAL READOUT DEVICE
Harold T. Westerheim, 1725 Hilltop Drive, Garland, Tex.
Filed Nov. 21, 1958, Ser. No. 775,637
5 Claims. (Cl. 313—109.5)

This invention relates to a visual readout device and in particular to a novel means for rendering visible a selected symbol from a plurality of normally invisible superposed symbols.

In the prior art visual readout devices of the space discharge type, a pair of metallic electrodes are sealed within a glass bulb filled with neon, argon, mercury, sodium, or other suitable gases or vapors at a relatively low pressure. When a unidirectional potential of sufficient magnitude, referred to as the igniting potential, is applied to the electrodes, a glow discharge is produced by negative electrons and positive gas ions and takes place within a relatively small distance from the exposed surface of the cathode or negative electrode, which appears to be surrounded or coated with a film of light. This film of light follows the contour of the cathode surface in all details.

One of the recognized shortcomings of the prior art glow discharge devices is the fact that when a symbol other than the first symbol is desired to be illuminated, the symbols preceding this particular symbol obscure the vision of the one that is desired to be displayed. A number of attempts have been made to solve this particular shortcoming, but none of them has proven to be completely satisfactory. For example, one such prior art device chooses a particular sequence in arranging the numbers such that the numbers positioned closest to the viewer will not obscure the other numbers which are more remote from the viewer. Another known device attempts to solve this problem by offsetting the numbers vertically and illuminating these numbers from a light source positioned at an angle so that the numbers will appear to be in line to the viewer.

These practices result in relatively complicated schemes, whereas the present system discloses a series of transparent plates, with suitable intervening spacers, assembled in a gas-tight, sandwich-style structure. A transparent conductive coating is placed upon a series of aligned symbol carrying plates which are also transparent so that there is no interference from the non-illuminated symbols to the observer's view of the illuminated symbol. The spaces between the plates are filled with a gas, such as neon, argon, mercury, sodium, or any one of a number of gases commonly used in illuminating signs at low pressure. Each space may be independent of the other spaces and filled with a different gas or gaseous mixture. In this manner a multi-color display is possible. Alternatively, the spaces may be made common by means of a connecting passage through the transparent plates and spaces in which case a common gas fills the entire assembly.

One very important feature of the present invention consists in using a transparent, conductive coating on the surfaces of the transparent plates to provide electrodes for the application of electrical energy to the gas within the structure. The coating is applied to both the front and back sides of the symbol carrying plate to define the contour of the illuminated symbol. A suitable terminal is electrically connected to one of the transparent conductive coatings associated with each symbol and is brought through the glass envelope to provide a means of connecting electrical energy from an external source to the internal structure of the device. The transparent conductive coatings may be applied by a number of methods to be described hereinafter. These methods lend themselves to mass production techniques.

Accordingly it is an object of the present invention to provide an improved construction of a visual in-line multi-symbol signal indicator.

Another object of the present invention is to provide an apparatus for presenting information from a stack of in-line symbols in which no one of the symbols obscures a reading of another one of the symbols.

It is another object of the present invention to provide a different color representation for different symbols in a visual readout device.

It is still another object of the present invention to provide a plurality of stacks of symbols to permit the use of a visual readout device in a variety of applications.

It is another object of the present invention to illuminate a desired symbol in a visual readout device by ionizing a gas between two cooperating conductive coatings each having the exact outline of the symbol.

These and other objects of the present invention will become apparent from the following description read in conjunction with the accompanying drawing in which:

FIGURE 1 discloses one use for the present invention for a scoreboard;

FIGURE 2 is an exploded view in perspective of the readout unit used in the present invention;

FIGURE 3 is a front view of one of the symbols that may be used in the present invention;

FIGURE 4 is a perspective view of the symbols and spaces in assembled relationship;

FIGURE 5 shows how a plurality of stacks of the symbols may be employed; and whereby multi-digit numbers may be caused to appear in the same envelope of view.

FIGURE 6 shows an exploded view in perspective of one of the symbols and its spacer with the associated power supply for this symbol.

FIGURE 7 discloses another use for this invention as a message display board.

FIGURE 8 is a schematic view showing the control arrangement employed with the board of FIGURE 7.

FIGURE 9 is a circuit diagram of the wiring of FIGURE 8.

FIGURE 10 is a cross sectional side elevational view taken along the lines 10—10 of FIGURE 11.

FIGURE 11 is a front elevational view of a modified embodiment of the device of FIGURE 2.

FIGURE 12 is an additional modified embodiment which may be used for permanent type displays.

A baseball scoreboard indicated generally at 50 is shown in FIGURE 1. At the conclusion of each half inning, the operator of the scoreboard indicates the number of runs scored by closing an appropriate switch as will be described hereinafter.

FIGURE 2 shows an assembly 25 of an exterior plate 12 with a cathode lead 22 attached to the back side thereof and symbol plates 16 and 20, each having a separate cathode lead attached to both sides of each plate. Positioned in between the symbol plates 16 and 20 are transparent insulating spacers or members 14 and 18. Anode leads 24 and 28 are connected to the symbols indicated as numerals 1 and 2 respectively. Additional cathode leads to the rear side of the symbol plates are shown at 26 and 30. Leads 22, 26 and 30 are brought through the glass envelope (formed when the spacers and the symbol plates are laminated together) and which encloses an ionizable gas thereby permitting the use of an external source of electrical energy. In this particular embodiment, a channel 32 is shown through each of the spacers and symbol plates to provide communication between all of the elements for a common illuminating gas, such as neon, argon, or the like. The numeral 1 appears both on the front side of symbol plate 16 and on the rear side of symbol plate 12. Similarly, the numeral 2 appears both on the front side of symbol plate 20 and on the rear side of symbol plate 16. The numeral 3 is shown on the rear side of symbol plate 20. In like fashion additional spacers and symbols may be provided for the numerals 4, 5, 6, 7, 8, 9, and 0 respectively. It is thus apparent that an illuminating, conductive material film is used to define both the anode and the cathode for the symbols that are to be illuminated. Although only numerals are shown and described, it will be apparent that letters, words or other symbols may be displayed.

One method of providing the transparent illuminating films on the symbol plates is to deposit a very thin layer of stannous chloride in the form of the desired symbol on the plates and to heat this layer in an oxygen atmosphere at 500° F. in the presence of a suitable catalyst. The chlorine is evolved as a gas and a transparent conductive coating of stannous oxide is formed on the surface of the plates. Such a coating may be applied to each side of the symbol plates simultaneously. Another method of providing a transparent conductive film on the front and back sides of the symbol plates is to vacuum deposit gold, silver, or copper. Then heat to a sufficiently high temperature until the metal boils off as a gas leaving only a thin molecular film. Still a third method of providing the transparent conductive films is to deposit a thin layer of tin on the desired location on the symbol plates by a vapor deposition or a chemical process, both of which processes are known in the art. The thin layer of tin is then heated in an oxygen atmosphere at 500° F. again with a suitable catalyst so that the tin combines with the oxygen to form stannous oxide. The conductive coatings thus formed are transparent so that one symbol in no way interferes with any other symbol in the in-line configuration. The symbol plates and spacers are made of a transparent plastic material such as Lucite or Plexiglas.

An additional method of embossing the characters or symbols onto the plates may be as follows:

(1) Apply a thin layer of a water solution of stannous chloride or bromide on the surface of the plate.

(2) Dry out the water.

(3) Heat to 500°–600° C. in air or oxygen to decompose the chloride or bromide, leaving a microscopic film of stannous oxide on the surface.

(4) Paint the character over the stannous oxide using an asphalt paint.

(5) Etch the surface not covered by the paint with zinc powder and water.

(6) Apply a 10% solution of hydrochloric acid to the surface surrounding the character.

(7) Scrub with nitric acid and then wash with water around the character.

(8) Apply paint remover directly to the character to remove the asphalt paint but leave the thin film of stannous oxide.

(9) Apply alcohol to take off the paint remover.

FIGURE 3 shows a front view of one of the symbols. FIGURE 4 shows an assembly view identified as 25A beginning with the symbol plate 16 which bears the numeral 1. The spacers are in the order of .005 to .010 inch thick. Because of the close proximity of the elements, the Crookes effect is eliminated. This effect is the unequal illumination of the ionized gas that is removed from the symbol to which an igniting potential has been applied, and occurs, in most conventional fluorescent lamps.

Reference is now made to FIGURE 5 in which a multiple symbol capacity glow discharge device is illustrated. The numerals on symbol plate 42 are offset on each side of the center line of the symbol plate to permit two symbols to be viewed at any given time. It can be seen, therefore, that by extending the width of the laminated sandwich structure now identified as 25B, any desired number of symbols may be displayed in a single unit.

FIGURE 6 discloses a switch series 34 on a switch panel 40. One switch 34–1 is shown connected in series with a battery 36 for applying the required ignition potential between anode lead 24 and cathode lead 22. Anode lead 24 is connected to the conductive layer in the form of numeral 1 on the front side of symbol plate 16 and cathode lead 22 is connected to the conductive layer in the form of numeral 1 on the back side of external plate 12. Separate parallel connections are made to each of the numerals through an appropriate switch on the switch panel 40. It can be seen, therefore, that an operator can illuminate any desired numeral by closing the proper switch thereby presenting the correct numerical indication on a public display such as scoreboard 50. It will be immediately apparent that other types of scoreboards such as those used for football or basketball or any other information may be displayed by the glow discharge device of the present invention. Also channel 32 may be eliminated or sealed off so that each symbol may be embodied in a separate compartment with a separate and distinct ionized gas. In this manner multi-colored displays are possible by using different gases associated with the different symbol compartments.

Although the present invention has been described with respect to specific embodiments, it is to be understood that various changes and modifications obvious to one skilled in the art are within the scope, intent and purview of this invention.

In FIGURE 7 it will be observed that the message display board 150 is similar to the baseball scoreboard 50 of FIGURE 1, but since this board 150 will be used to spell out words, each display window 151 will contain a stack of 26 figure plates 116 to accommodate all the figures of the alphabet. Each plate 116 is backed by a spacer plate 114, and each character 152 and 152a is connected to a lead 153 and 153a of the electric control circuit 154 as seen in FIGURE 8. The typewriter 155 is connected into the circuit 154 so that each key 156 closes a switch 157 to direct electric power from battery 158 through a contact 159′ which corresponds to a particular display window, for instance 151. This action will cause the letter "A," or whatever letter corresponds to the key 156 which was struck by the operator, to complete the electric circuit through its ambient gas and back through lead 153a to the switch 157. Since it is desirable for the letters to continue to glow for some time after the typewriter key 156 is released, a holding switch relay 165 is installed in each lead 153a, and these relays are gang released by a bar 160 by a single act of the operator. If it becomes desirable to erase a single letter, the individual normally closed switch 161 is depressed. Referring now to FIGURE 9 a more detailed observation of the electrical operation may be observed. In both FIGURES 8 and 9 the characters 152 and 152a are shown to be identical for clarity of illustration, it being understood that the arrangement shown in detail in FIGURE 2 is the intended usage. The carriage 164 of the typewriter 155 is equipped with a moving electric contact 159′ which engages a different frame contact 159″ for each space on the typewriter and these spaces correspond to the number of display windows on the board 150. The switch 157 (FIGURE 9) when closed by key 156 engages a double pole holding relay 165, so that an electrical circuit is completed through the character 152 even after the key 156 is released. However, once the switch 161 is depressed, the entire circuit is deenergized until another key 156 is pressed. When relay coil 166 is energized by closing switch 157 both switch arms 167 and 168 are closed, and when switch 157 is opened, the arms 167 and 168 would normally be spring-returned to the initial or open position; however, here a second circuit is completed from battery 169 through coil 166 to keep the coil energized and keep both switches 167 and 168 closed as described.

In FIGURES 10, 11, an embodiment employing two spaced films 170 and 171 of transparent, conductive materials are shaped in the outline of the character desired such as 252 and on the same transparent plate 216. A space 173 separates the films 170 and 171 so that when plate 216 is enclosed by cover plate 174, and the enclosed area is filled with a gas of the type described, the complete character will glow when electrically energized. Actually a current will flow between 170 and 171 and illuminate the gas in space 173 when terminals 176 and 177 are connected to an electric circuit 253.

FIGURE 12 shows an embodiment of a permanent sign made up of a continuous film 370 on plate 316. That part of the film or the lead wire 353 which is desired to remain non-lighted may be covered by an insulator 380 and the gas immediately surrounding this insulation will not glow.

What is claimed is:

1. A visual readout device comprising a plurality of stacked plates of transparent material, certain of said plates having a transparent conductive symbol deposited on the front side thereof and another conductive symbol on the rear side thereof, a plurality of insulating members spaced in alternate fashion between said plates and provided with a centrally located aperture, a channel extending longitudinally through said plates and said insulating members, a single glow discharge gas entirely filling said channel and the apertures in said insulating members, and means for producing a gaseous discharge between the conductive symbol on the rear side of a selected one of said plates and the conductive symbol on the front side of the next succeeding plate.

2. A visual readout device as described in claim 1 wherein the conductive symbols on the front and rear sides of said plates are transparent coatings of stannous oxide.

3. A visual readout device comprising a plurality of stacked plates of transparent material, certain of said plates having a deposited conductive symbol on the front side thereof and another conductive symbol on the rear side thereof, a plurality of insulating spacers spaced in in alternate fashion between said plates and provided with a centrally located aperture, a glow discharge gas of a composition to produce a visible glow and color entirely contained in each of the apertures between said plates, and means for producing a gaseous discharge between the conductive symbol on the rear side of a selected one of said plates and the conductive symbol on the front side of the next succeeding plate the glow discharge gas contained in certain of said aperatures being of a different composition for producing a glow of a color different from the color produced by the gas in other apertures.

4. A visual readout device as described in claim 3 wherein the conductive symbols on the front and rear sides of said plates are transparent coatings of stannous oxide.

5. A visual readout device comprising a plurality of stacked plates of transparent material, certain of said plates having a conductive symbol on the front side thereof and another conductive symbol on the rear side thereof, said plates being superimposed one behind the other, and means for producing a gaseous discharge between the conductive symbol on the rear side of a selected one of said plates and the conductive symbol on the front side of the next succeeding plate, said conductive symbols on the front and rear sides of said plates being transparent coatings of stannous oxide.

References Cited in the file of this patent

UNITED STATES PATENTS

| | | |
|---|---|---|
| 2,132,912 | Williams | Oct. 11, 1938 |
| 2,142,106 | Boswau | Jan. 3, 1939 |
| 2,756,366 | Maynard | July 24, 1956 |
| 2,623,111 | Chervenka et al. | Dec. 23, 1952 |
| 2,848,638 | Smith | Aug. 19, 1958 |
| 2,878,407 | Engelman et al. | Mar. 17, 1959 |
| 2,928,014 | Aiken et al. | Mar. 8, 1960 |
| 2,962,698 | Mathomel | Nov. 29, 1960 |